US008317480B2

(12) United States Patent
Scarpelli

(10) Patent No.: US 8,317,480 B2
(45) Date of Patent: Nov. 27, 2012

(54) TURBINE ASSEMBLY AND ENERGY TRANSFER METHOD

(76) Inventor: Tadd M. Scarpelli, Round Lake, IL (US)

( * ) Notice: Subject to any disclaimer, the term of this patent is extended or adjusted under 35 U.S.C. 154(b) by 602 days.

(21) Appl. No.: 12/462,149

(22) Filed: Jul. 30, 2009

(65) Prior Publication Data
US 2011/0027089 A1   Feb. 3, 2011

(51) Int. Cl.
*F03D 3/00* (2006.01)
(52) U.S. Cl. .................. 416/197 A; 415/4.2; 415/4.4
(58) Field of Classification Search ........ 415/1, 4.1–4.4, 415/905, 907; 416/197 A, 197 R, 243; 290/55
See application file for complete search history.

(56) References Cited

U.S. PATENT DOCUMENTS

| | | | |
|---|---|---|---|
| 625,614 A * | 5/1899 | Thompson | 416/174 |
| 2,252,788 A * | 8/1941 | Sparr | 416/197 R |
| 4,293,274 A | 10/1981 | Gilman | |
| 4,365,929 A | 12/1982 | Retz | |
| D273,037 S | 3/1984 | Dodge | |
| 4,890,976 A | 1/1990 | Jansson | |
| 4,979,871 A | 12/1990 | Reiner | |
| 5,405,246 A | 4/1995 | Goldberg | |
| 5,503,530 A | 4/1996 | Walters | |
| 5,656,865 A * | 8/1997 | Evans | 290/55 |
| D439,324 S | 3/2001 | Wood | |
| 6,242,818 B1 | 6/2001 | Smedley | |
| 6,247,897 B1 * | 6/2001 | Patel | 416/197 R |
| 6,465,899 B2 | 10/2002 | Roberts | |
| 6,870,280 B2 | 3/2005 | Pechler | |
| 6,962,478 B2 | 11/2005 | Tsipov | |
| D517,986 S | 3/2006 | Wobben | |
| 7,040,859 B2 | 5/2006 | Kane | |
| 7,314,346 B2 | 1/2008 | Vanderhye et al. | |
| 7,329,965 B2 | 2/2008 | Roberts et al. | |
| 7,344,353 B2 | 3/2008 | Naskali et al. | |
| 7,362,004 B2 | 4/2008 | Becker | |
| 7,393,177 B2 | 7/2008 | Rahai et al. | |
| 7,488,150 B2 | 2/2009 | Krippene | |
| 2006/0163682 A1 | 7/2006 | Pan et al. | |
| 2007/0104582 A1 | 5/2007 | Rahai et al. | |
| 2008/0095631 A1 | 4/2008 | Bertony | |
| 2008/0187432 A1 | 8/2008 | Cowan | |
| 2008/0213083 A1 | 9/2008 | Unno | |
| 2009/0146432 A1 | 6/2009 | Ballena | |
| 2009/0196763 A1 * | 8/2009 | Jones et al. | 416/90 R |
| 2011/0070094 A1 * | 3/2011 | Haddjeri | 416/243 |

* cited by examiner

*Primary Examiner* — Edward Look
*Assistant Examiner* — Andrew C Knopp
(74) *Attorney, Agent, or Firm* — Meroni & Meroni, P.C.; Charles F. Meroni, Jr.; Christopher J. Scott

(57) ABSTRACT

A turbine assembly comprises 2 or more symmetrical vanes or blades attached to a centralized shaft. The assembly may be placed into a fluid current for transferring energy therefrom. Each blade has a scoop with a relatively broader span at the top end and a relatively narrow span at the bottom, which scoop-like vane or blade resembles an inverted tear drop. Eighty-six percent of the potential energy vector is captured within the blade assembly. One end may be connected to a power generation device that will create electrical power when rotated. Certain energy transferring methodology is believed further supported by the vane or blade designed incorporated into the overall turbine assembly.

21 Claims, 6 Drawing Sheets

TURBINE ASSEMBLY AND ENERGY TRANSFER METHOD

BACKGROUND OF THE INVENTION

1. Field of the Invention

The present invention generally relates to a turbine for transferring energy from a fluid current. More particularly, the present invention relates to a turbine assembly having uniquely configured inverted tear drop shaped vanes or blades for reacting to a fluid current driven thereagainst and transferring said reaction to a centralized rotatable shaft.

2. Description of Prior Art

U.S. Pat. No. 4,293,274 ('274 Patent), which issued to Gilman, discloses a Vertical Axis Wind Turbine for Generating Usable Energy. The '274 Patent describes a wind turbine for converting wind forces into usable energy having a main shaft rotatably mounted in the axis of rotation for the wind turbine, and a pair of coacting complementary longitudinally extending vane members are connected to each other by a plurality of support and transmission assemblies in the form of articulated members and to the main or driven shaft for driving engagement thereof.

The coacting vane members of the device shown in the '274 Patent may either have straight side edges or preferably have spiralled or helically shaped side edges which in the closed position are aligned and in abutment with each other to define and form a right circular cylinder in side elevation. The vanes are movable between a normally open starting position and a closed position to vary the total vane surface available for contact by the wind forces acting at any given time when the wind turbine is in operation.

Articulated members of the support and transmission assemblies are pivoted to permit translational or side wise movement to and fro of the complementary vanes transverse relative to each other and the vertical axis through the main shaft, and pivotal cross members on each of the articulated support and transmission assemblies are vertically linked together to simultaneously alter the articulated members during such movement.

The respective complementary and cooperating vanes have their weight so distributed that centrifugal forces will act to move the complementary vanes towards the closed or right circular cylindrical form automatically as high rotational speeds result from excessive wind. Additionally the wind turbine as above described with resilient means to move the coacting cooperating vanes to the normally open starting position.

U.S. Pat. No. 5,405,246 ('246 Patent), which issued to Goldberg, discloses a Vertical Axis Wind Turbine with a Twisted Blade Configuration. The '246 Patent describes a vertical-axis wind turbine having two or more elongated blades connected to a rotor tower. The tower defines an axis of rotation and is linked, preferably via a gearbox or other torque-converting arrangement, to the shaft of a generator.

Each blade is "twisted" so that its lower attachment point is displaced angularly relative to its upper attachment point. In a preferred embodiment, the radial distance of each blade from the axis of rotation varies between upper and lower attachment points such that the blade lies approximately along a "troposkein", which is the shape assumed by a string clamped at each end and spun about an axis passing through the ends of the string.

The ratio between blade chord length and blade thickness is preferably constant over the length of each blade, with the middle of each blade approximately 80% as thick as its ends. The cross-section of the blades may be teardrop-shaped, shaped as an airfoil, rectangular, or curved in some other way.

U.S. Pat. No. 6,465,899 ('899 Patent), which issued to Roberts, discloses an Omni-Directional Vertical-Axis Wind Turbine. The '899 Patent describes an omni-directional, vertical-axis wind turbine comprising a rotor/stator combination which maximizes energy production by increasing wind velocity and pressure plus eliminating back pressure. The stator section includes a plurality of vertical blades secured between upper and lower conical sails.

The blades have a radius fundamentally equal to that of the rotor and a chord length approximately 1.25 times its radius. The rotor has a diameter approximately equal to one-half that of the stator and has a plurality of concave blades secured to and spaced from a vertical spindle, said blades being arranged in stages within the vertical rise of the rotor. Each rotor blade has a chord line equal to twice its radii and a chord length approximating one-third the diameter of the stator.

U.S. Pat. No. 7,314,346 ('346 Patent), which issued to Vanderhye et al, discloses a Three-Bladed Savonius Rotor. The '346 Patent describes a Savonius style three bladed vertical axis wind turbine rotor has operational characteristics superior to those of conventional three bladed rotors. The blades have high curvature and a high skew factor, for example a curvature of greater than 7:1 (e.g. 2:1-5:1), and a skew factor of greater than 0.6 (e.g. 0.78-0.9).

The rotor also includes at least one vertical shaft, the blades operatively connected to the shaft. The rotor typically has an aspect ratio of at least 2:1. The rotor typically has a maximum power coefficient (Cp) of at least twice that of an otherwise identical rotor with a skew factor of 0.5 or less. The rotor can drive a generator with a drive which automatically increases the effective gear ratio as the rotational speed of the rotor increases; or the rotor can be connected to a propeller of a multihull wind powered boat.

U.S. Pat. No. 7,362,004 ('004 Patent), which issued to Becker, discloses a Wind Turbine Device. The '004 Patent describes a hybrid blade wind turbine device formed of at least a pair of straight outer airfoil blades, and a pair of inner helical wing blades, as supported for rotation within a safety protective cage structure, which wind turbine can be mounted in the vertical, horizontal, or other aligned operational positions.

The inner helical half wing blades, being preferably somewhat shorter than the length of the outer airfoil blades, act to "regularize" the swirling wind regime flowing through the hybrid wind turbine, so as to maximize the efficiency of the outer airfoil blades. The helical half wing blades can be formed of individual segmented vane segments to provide improved operational capabilities for the overall hybrid wind turbine. To best harness annualized available wind conditions, the hybrid wind turbine can be customized, through modification of the number of vane segments, the selection of the specific shape of the outer airfoil blades, and the specific operational positioning of the outer airfoil blades. Alternatively, the helical half wing blades can be formed as generally smooth-walled blades.

United States Patent Application Publication Number US 2007/0104582, which was authored by Rahai et al., describes a high efficiency vertical axis wind turbine having an optimized blade shape for increased torque output. The shape of the optimized profile includes a camber portion at a leading edge region of the blade with a maximum height to chord ratio (Y/C) at when the non-dimensional chord length (X/C) is approximately one third. An intermediate region follows the leading edge region and is characterized by a shallow convex region, followed by a flow reattachment surface at the trailing edge region characterized by a second concave region and a local maximum of the height to chord ratio at approximately four fifths of the non-dimensional chord length.

United States Patent Application Publication Number 2008/0095631, which was authored by Bertony, describes a vertical axis wind turbine comprising three vertically extending sails where each sail comprises a strip of substantially constant width. The opposite ends of each sail are longitudinally twisted to have a pitch angle of approximately 90 degrees. The turbine further comprises a vertically extending central core and a vertically extending opening between each sail and the core.

Also disclosed is an improvement in a vertical axis wind turbine having at least one main blade each of which has a longitudinal extent and a longitudinally extending radially outermost edge. The improvement comprises a longitudinally extending auxiliary blade spaced from the main blade to define a venturi inducing gap between the main blade and the auxiliary blade whereby the turbine has a zone of influence which extends radially beyond the maximum radial extent of the blades.

It will be seen from a review of the prior art that the art fails to disclose a turbine assembly having scoop-like tear drop shaped rotor blades or vanes for capturing fluid current directed thereagainst within a range of 155 rotational degrees. The prior art thus perceives a need for such a turbine or rotor assembly as described in more detail hereinafter.

SUMMARY OF THE INVENTION

A turbine is essentially a rotary engine that extracts energy from a fluid current, as may be exemplified by water or wind currents. The simplest turbines have one moving part, a rotor assembly, which essentially comprises a shaft with blades or vanes attached thereto. Moving fluid or a fluid current (such as water, steam, or air (wind)) acts on the blades, or the blades react to the flow or fluid current, so that they rotate and impart energy to the rotor assembly.

The current technology of relatively small scale wind turbines is regionally challenged due to inadequate average wind speeds. Less than 50% of the United States can use existing wind turbines in a cost efficient manner due to the need for average wind speeds of 25 miles per hour or better. The blade according to the present invention provides a scoop-like, inverted tear drop design, which design is optimized to harvest available wind stream and the wind amplifications that result at the apex of the structure.

The efficiency that results in a lower start up and constant wind speed of 12 miles per hour effectively increases the regional area that wind energy can be used in the United States by 25%. The invention is designed to deliver, for example, a rated power of 2500 watts with an approximate wind speed of 12 miles per hour (MPH). Current or state of the art turbines are relatively inefficient for capturing and transferring energy from turbulent wind sources as compared to the present invention since the inverted tear drop vane or blade design is capable of capturing fluid currents directed thereagainst within a relatively large range of current direction.

It is further noted that current or state of the art wind turbines are expensive with many and complex assortment of moving components, as compounded by the requirement for elevated mounting on costly towers. The relatively small blade design according to the present invention is optimized to be mounted on a structure's APEX roof making a tower unnecessary. Accordingly, the relatively small design enables potential users to makes use of the invention in urban areas including residential homes and small businesses.

This invention generally relates to a turbine assembly having multiple symmetrical blades to harness fluid currents (primarily wind currents) to turn a generator to create electric power. Wind power is a low cost alternative to fossil fuels and has become a growing market since the US government is providing tax credits for installation. The problems that have been noted with state of the art wind turbines is that they have expensive installation costs, require large acreage; and require a high constant wind requirement that excludes many parts of the United States where wind turbines can be used.

The blade design and assembly incorporating the same according to the present invention increases efficiency and use of wind from more directions and funnels the wind from previous blade into force of adjacent blade to further rotatably drive the rotor assembly. The turbine assembly can be mounted on top of a structure or a tower for easy low cost installation, but has also demonstrated effective rotation in water current for application in hydro electric power generation.

BRIEF DESCRIPTION OF THE DRAWINGS

Other features of my invention will become more evident from a consideration of the following brief description of patent drawings.

DESCRIPTION OF THE PREFERRED EMBODIMENT(S)

Figure 8:
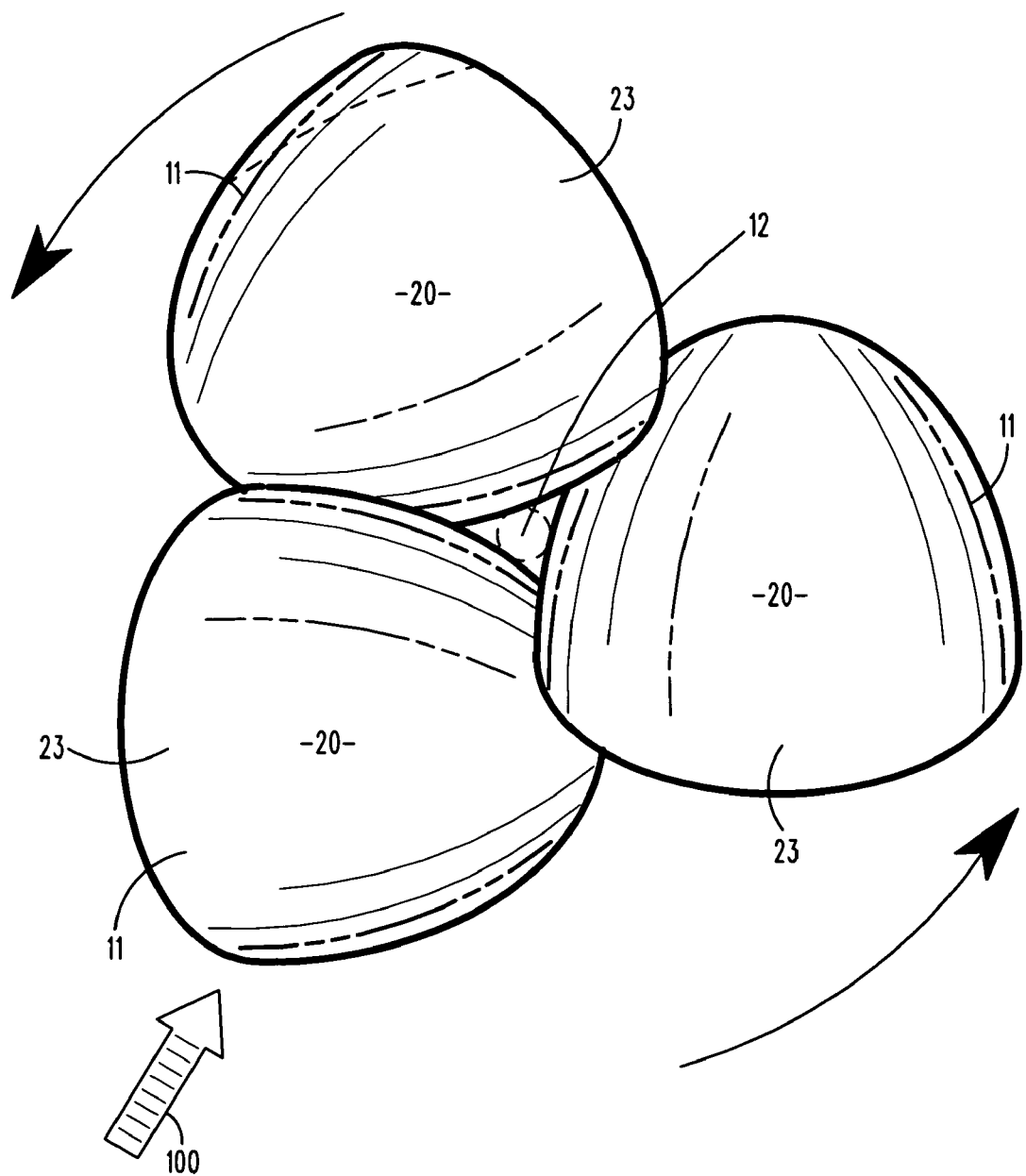
FIG. 8 is a top plan type depiction of the turbine assembly according to the present invention showing three vanes attached to a centralized shaft member showing a fluid current direction and counter-clockwise rotation of the assembly.
Figure 8A:
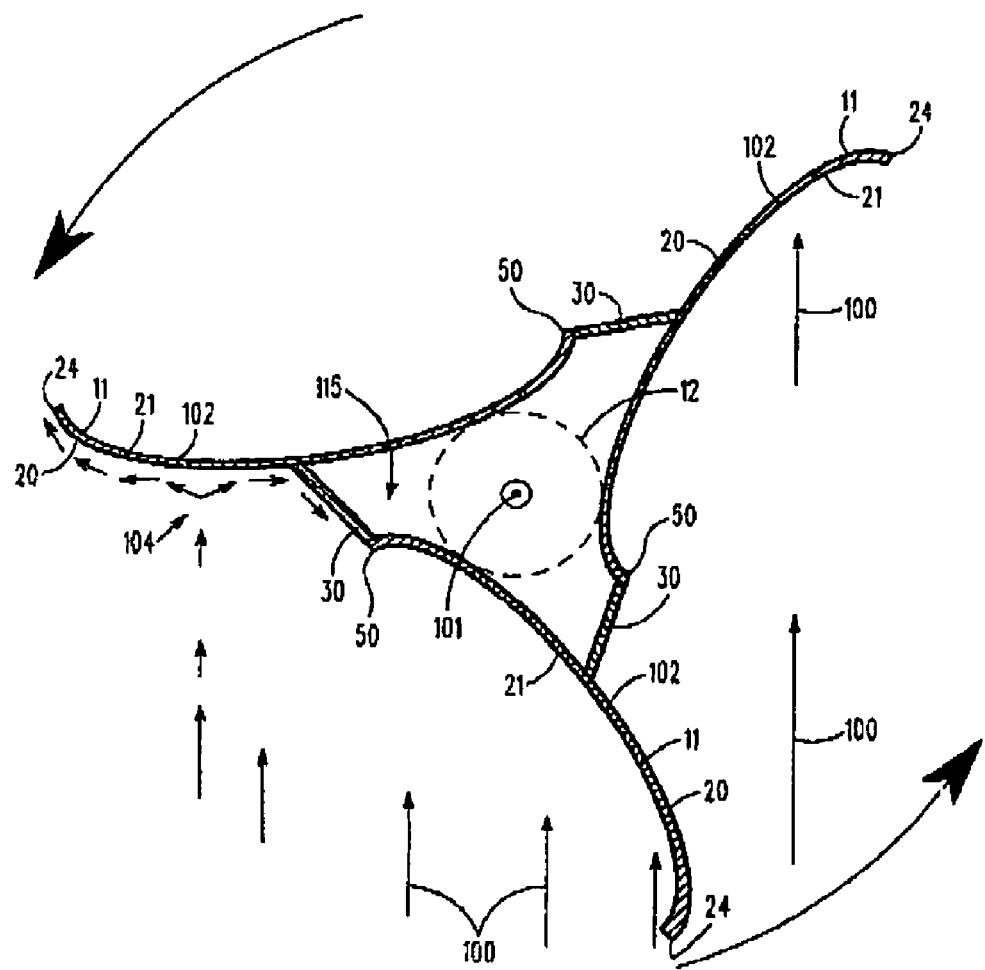
FIG. 8(a) is a transverse cross section type depiction of the turbine assembly according to the present invention showing generally C-shaped transverse cross sections of the vanes and bridge portions interconnecting or spanning the vanes.
Figure 9:
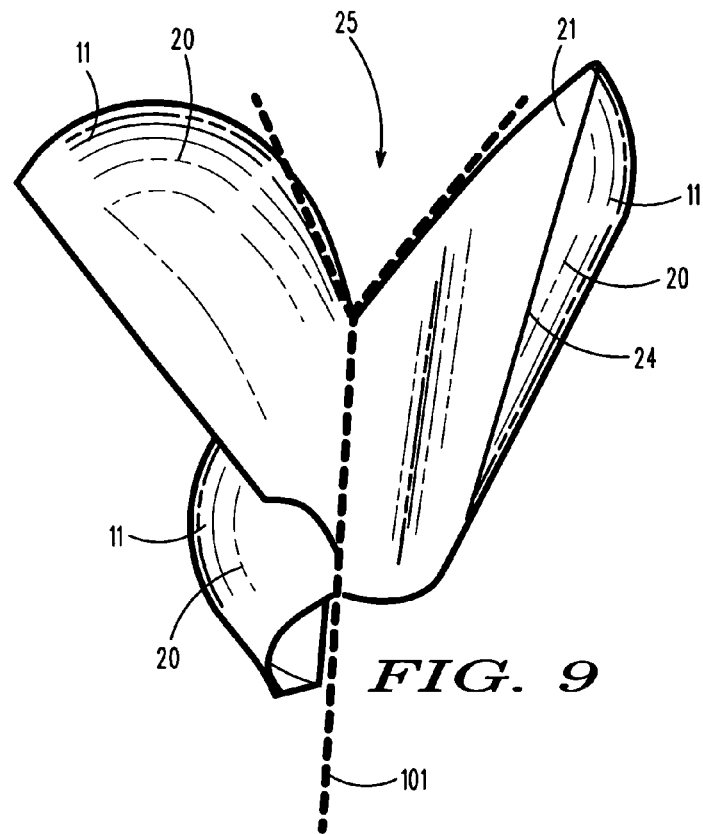
FIG. 9 is a bottom perspective type depiction of a diagrammatic turbine assembly according to the present invention showing a drag-reducing, V-shaped gap intermediate adjacent vanes.

Referring now to the drawings with more specificity, the preferred embodiment of the present invention is a vertical axis type turbine assembly 10 having a series of vanes 11 or blades substantially equally spaced about the circumference or body of a rotatable spindle or shaft 12 for transferring energy from a fluid current as generally depicted at arrows 100. The rotor or turbine assembly 10 according to the present invention preferably comprises a central shaft 12 and a series of vanes 11 (preferably three), which three vanes 11 or blades are generally spaced 120 degrees from one another as generally depicted in FIGS. 8 and 8(a).

As generally depicted in the various figures, the shaft 12 is rotatable about an axis of rotation as at 101, and may be outfitted with a generator or certain similar means for generating electricity (not specifically illustrated). The vanes 11 are each attached to the shaft 12 about its circumference and may be described as having an inverted, scoop-like, tear drop shape. Each vane or blade 11 thus comprises a generally arched, arced or C-shaped cross section 102 through a transversely oriented first plane as generally depicted in FIG. 8(a).

Figure 1:
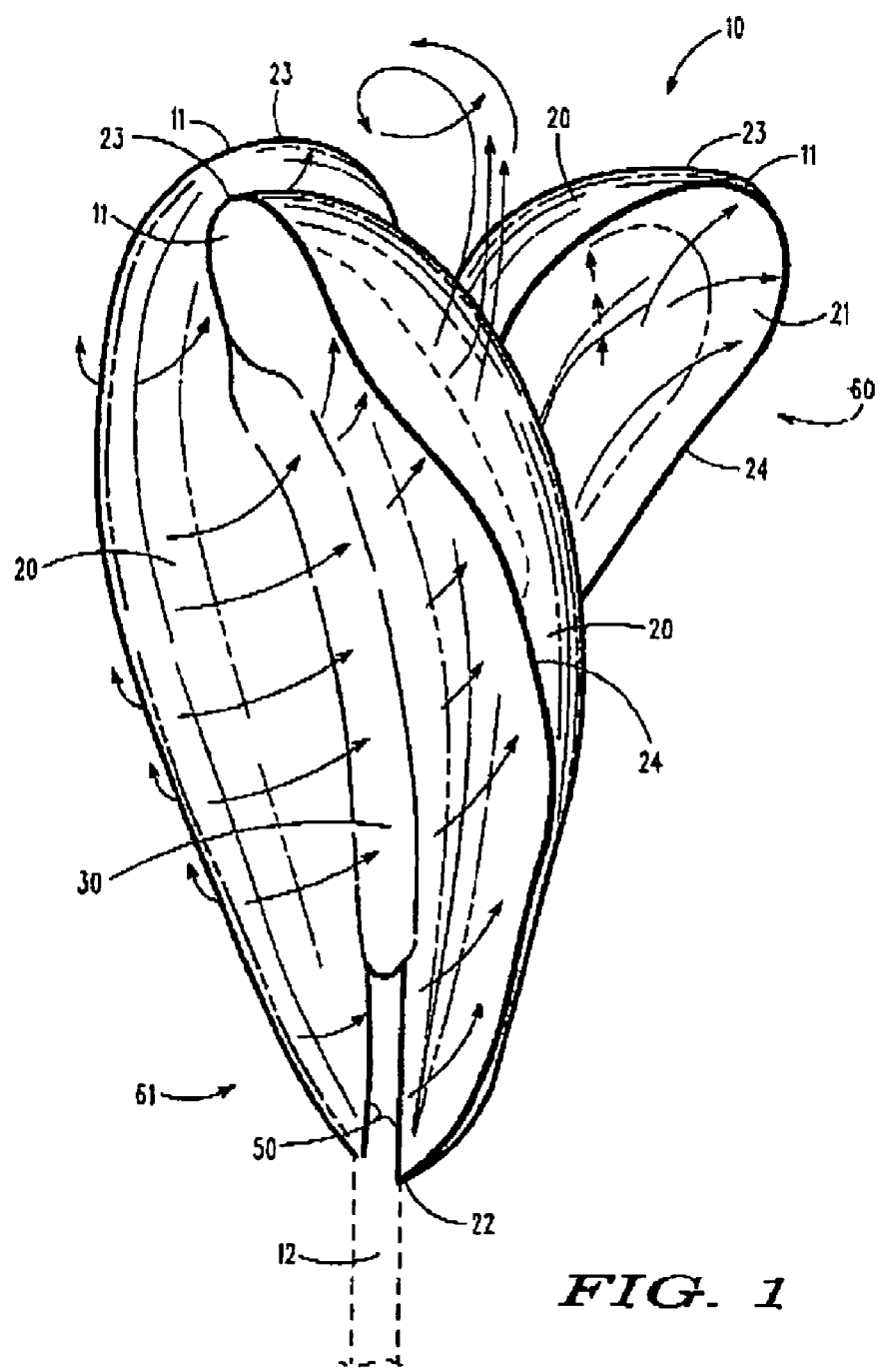
FIG. 1 is a first top perspective type depiction of a preferred embodiment of the turbine assembly according to the present invention showing three blades or vanes attached to a centralized shaft with a fluid current being directed against the turbine assembly.
Figure 5:
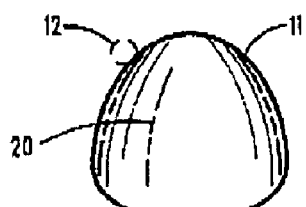
FIG. 5 is a top plan view of a vane according to the present invention in next to a shaft member (shown in broken lines).
Figure 2:
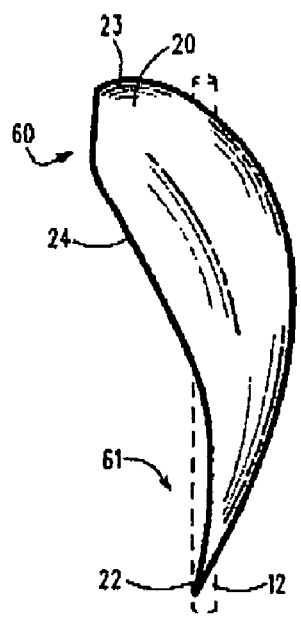
FIG. 2 is a first side plan view of a vane according to the present invention in front of a shaft member (shown in broken lines).
Figure 2A:
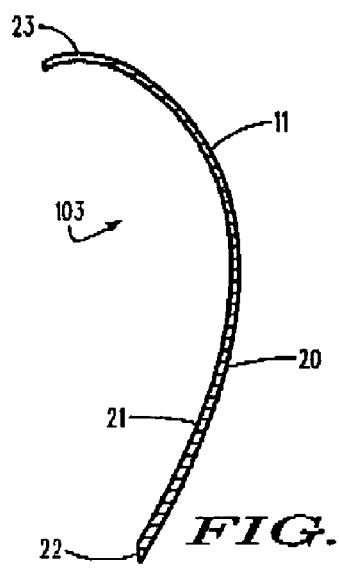
FIG. 2(a) is a sagittal type cross section of the vane otherwise depicted in FIG. 2 showing a generally (and inverted) J-shaped cross section.
Figure 6:
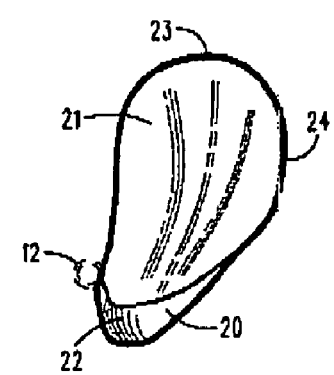
FIG. 6 is a bottom plan view of a vane according to the present invention in next to a shaft member (shown in broken lines).

Further, each vane or blade 11 comprises a generally (and inverted) hooked or J-shaped cross section 103 through a sagittally oriented second plane orthogonal to the first plane as generally depicted in FIG. 2(a). Notably the C-shaped cross section 102 is preferably orthogonal to the axis of rotation 101 and the J-shaped cross section 103 is parallel to the axis of rotation 101.

Given the generalized shape of the cross sections 102 and 103, the vanes or blades 11 each have a generally convex outer surface 20 and a generally concave inner surface 21. The concave surfaces 21 essentially function to capture a fluid current (as at 100) directed thereagainst or thereinto, and the convex surfaces 20 essentially function to deflect fluid current 100 thereabout.

Each vane or blade 11 further comprises a radially inner edge as at 50, and a radially outer edge as at 24. The convex outer surfaces each preferably oppose and abut the central shaft 12 at superior vane portions (as at 60) and the inner radial edges 50 oppose and abut or extend from the central shaft 12 at inferior vane portions (as at 61).

Figure 3:
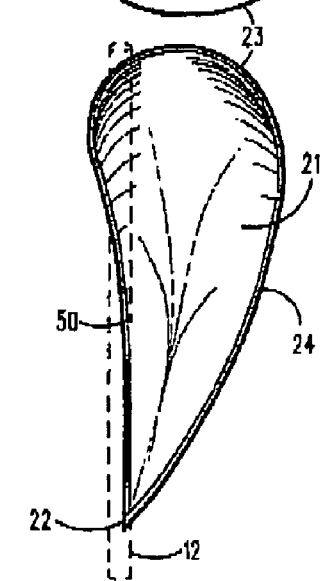
FIG. 3 is a front plan view of a vane according to the present invention shown next to a shaft member (shown in broken lines).
Figure 4:
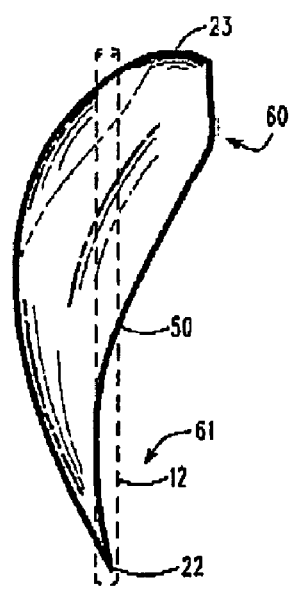
FIG. 4 is a second side plan view of a vane according to the present invention behind a shaft member (shown in broken lines).

The convex outer surfaces 20 each preferably helically wrap around a portion of the central shaft 12 (as generally and comparatively depicted in FIGS. 2-4 for deflecting the fluid current into the concave inner surfaces 21 such that the concave inner surfaces capture deflected fluid current for increasing the first current pressure relative to the second current pressure.

The concave surfaces 21 and convex surfaces 20 are respectively associated with a first force or pressure and a second force or pressure, which first pressure is greater in magnitude than the second pressure for imparting a torque through or coaxial with the axis of rotation 101 and rotating the shaft 12 thereabout. The figures generally show a counterclockwise rotation and thus the torque is directed out of the page in FIG. 8(a).

In this last regard, it should be noted that if a force is allowed to act through a distance, it is doing mechanical work. Similarly, if torque (τ) is allowed to act through a rotational distance, it is doing work. Power (P) is the work per unit time. However, time and rotational distance are related by the angular velocity (ω) whereby each revolution results in the circumference of the circle being travelled by the force that is generating the torque.

The power (P) injected by the applied torque (τ) may be calculated as per the following relation:

$P(t)=\tau(t)\cdot\omega(t)$, or perhaps more accurately in terms of fluid pressure (p) and fluid flow (Q), by the following relation:

$P=p\cdot Q$

Figure 7:
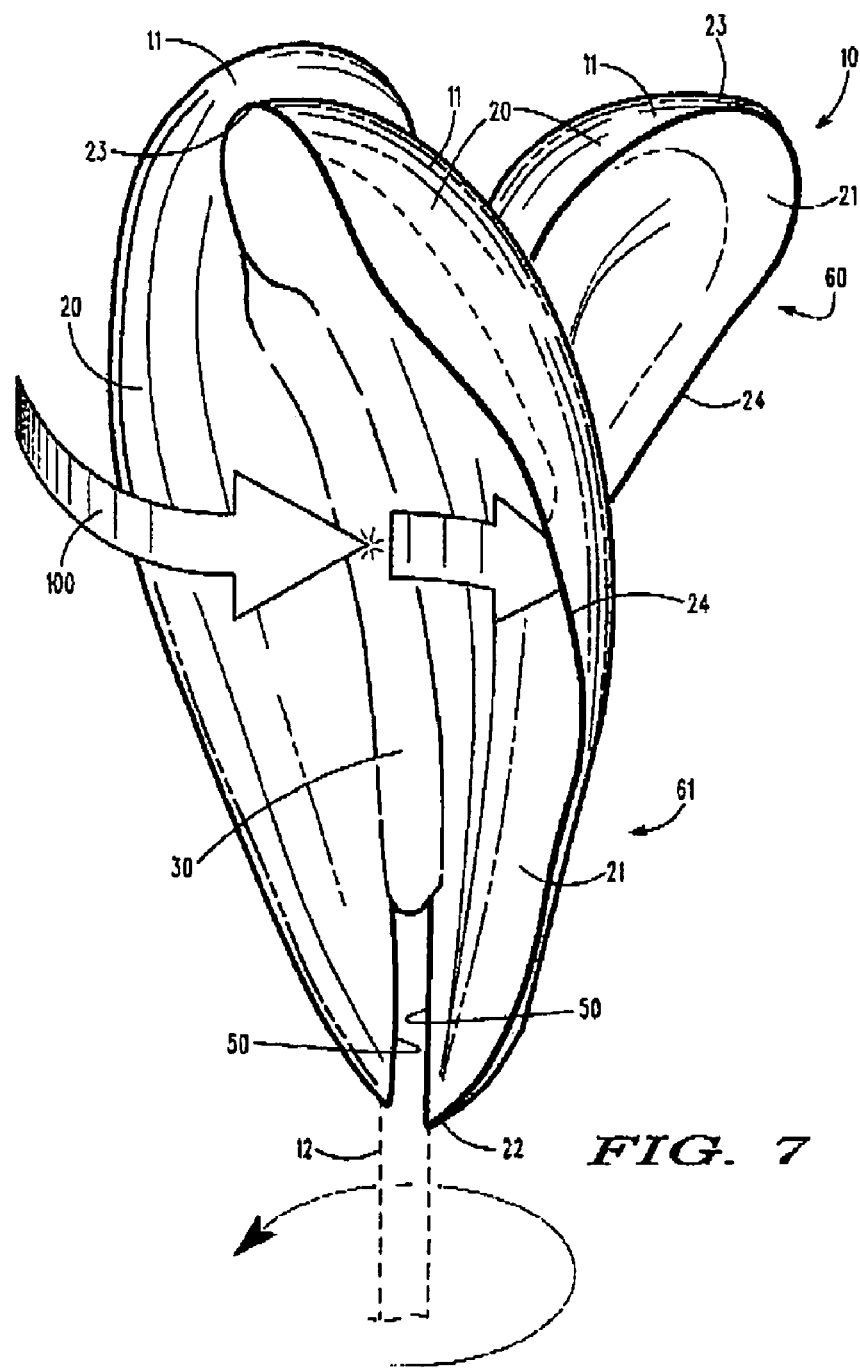
FIG. 7 is a second top perspective type depiction of a preferred embodiment of the turbine assembly according to the present invention showing three blades or vanes attached to a centralized shaft with a fluid current being deflected from convex surfacing and thereby directed into concave surfacing of adjacent vanes.

It should be noted that in the preferred embodiment, the convex surfaces 20 or convex surfacing of the vanes or blades 11 operate to deflect the fluid current 100 into the concave surfaces 21 of adjacent vanes or blades 11 such that the concave surfaces 21 capture deflected (as at 104) fluid current 100 for increasing the first pressure relative to the second pressure and thus maximizing the torque as generally and comparatively depicted in FIGS. 7 and 8(a).

In this last regard, it is contemplated that the turbine assembly 10 may further preferably comprise bridge portions 30, which bridge portions 30 extend intermediate adjacent vanes 11 for eliminating gaps between adjacent vanes 11 and/or for reducing drag on the assembly. In other words, the bridge portions 30 operate to direct deflected fluid current 100 from the convex surfaces 20 to the concave surfaces 21 such that the concave surfaces 21 may more readily capture the fluid current 100.

The bridge portions 30 preferably connect the radially inner edges 50 to the convex outer surfaces 20 of adjacent vanes 11 such that the bride portions 30 and convex outer surfaces 20 of the vanes 11 enclose a transverse space as at 115 about the central shaft 11. Together, the bridge portions 30 and convex outer surfacing 20 thus reduce drag between adjacent vanes.

Each vane or blade 11 further comprises a pointed inferior terminus as at 22, a rounded superior terminus as at 23, and sloped outer edges 24 extending intermediate the inferior and superior termini 22 and 23. The superior termini 23 are preferably separated by a V-shaped gap 25, which gap 25 essentially functions to reduce drag. In other words, fluid current 100 may escape surface capture via the gap(s) 25, thereby reducing drag on the assembly 10.

Figure 10:
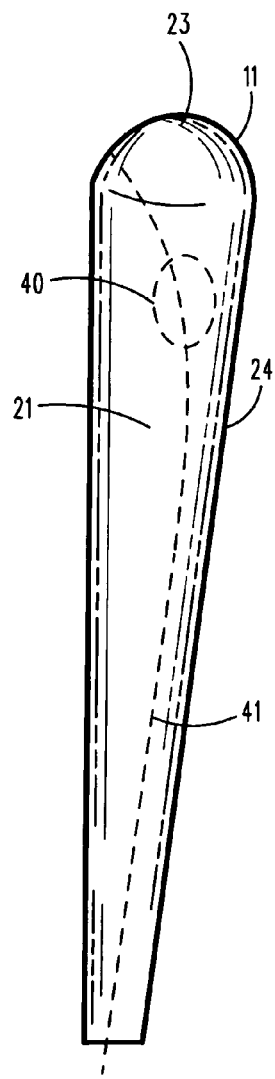
FIG. 10 is a diagrammatic front play type depiction of a vane according to the present invention showing a center of curvature and a line of curvature extending therefrom.
Figure 11:
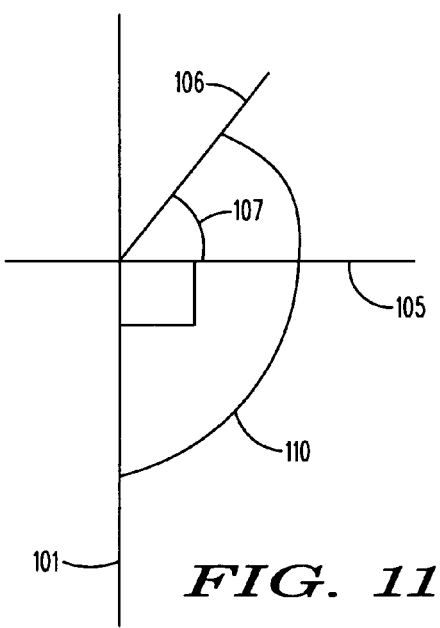
FIG. 11 is a diagrammatic depiction of a Cartesian coordinate system, depicting horizontal X-axis and a vertical Y-axis with a line extending into the first quadrant thereof.

Each vane 11 further comprises a center of curvature as at 40 and a line of curvature as at 41. The centers of curvature 40 are preferably located at the upper third of the concave surfaces 21, and the lines of curvature 41 generally extending inwardly from the centers of curvature 40 towards the shaft 12 as generally and diagrammatically depicted in FIG. 10.

The vanes or blades 11, so shaped and configured, essentially function to capture directed fluid current 100 intermediate a direction range (as at 110) of the current 100. In other words, fluid current 100 may be directed against the turbine from a variety of directions. These directions may be defined by a direction range 110 or range of current direction. The direction range 110 may be said to begin in or from the axial direction from the inferior terminus 22 (i.e. fluid current 100 may be axially directed into the vanes 11 via the inferior termini 22).

It is contemplated that the upper limit 106 of the direction range 110, the direction of fluid current 100 may extend 65 degrees (as at 107) above the transverse plane (as at 105) or 155 degrees from the axis of rotation 101. It will thus be seen that while the preferred orientation of the turbine assembly 10 is vertical, it is also designed to capture fluid current 100 axially directed thereagainst (thus being capable of horizontal orientation) as well as downwardly angled fluid current 100.

While the above description contains much specificity, this specificity should not be construed as limitations on the scope of the invention, but rather as an exemplification of the invention. For example, it is contemplated that the present invention essentially provides a turbine or rotor assembly for transferring energy from a fluid current 100. The turbine or rotor assembly is contemplated to essentially comprise a central shaft 12 and at least two vanes 11.

The shaft 12 is rotatable about an axis of rotation 101, and the vanes are each attached to the shaft 12. The vanes 11 each comprises a C-shaped cross section through a first plane as generally depicted in FIG. 8(a) and a J-shaped cross section through a second plane as generally depicted in FIG. 2(a). These cross sections are orthogonal to one another such that the scoop-like vanes 11 are generally shaped to resemble an inverted tear drop.

The cross sections each further have a convex surface (as at 20) and a concave surface (as at 21), which concave surfaces essentially function to capture a directed fluid current (as at 100) and the convex surfaces essentially function to deflect said fluid current. The concave surfaces 21 and convex surfaces 20 are respectively associated with first and second current pressures whereby the first current pressure is greater than the second current pressure for imparting a net rotative force to the central shaft 12 for rotating the shaft 12 about the axis of rotation 101.

The convex surfaces 20 preferably deflect the fluid current 100 into the concave surfaces 21 such that the concave surfaces 21 capture deflected fluid current 100 for increasing the first pressure relative to the second pressure, thereby maximizing the net rotative force. Bridge portions 30 preferably extend intermediate adjacent vanes 11 for reducing drag between adjacent vanes 11, and preferably function to direct deflected fluid current 100 from the convex surfaces 20 to the concave surfaces 21 for capturing the fluid current.

Each vane preferably comprises a pointed inferior terminus 22, a rounded superior terminus 23, a sloped outer edge 24 extending intermediate the inferior and superior termini 22 and 23, a center of curvature 40 located at the upper third of the concave surfaces 21, and a line of curvature 41 extending inwardly from the center of curvature 40 towards the shaft 12. The vanes 11 each function to capture directed fluid current intermediate a direction range 110 beginning in or from the axial direction from the inferior terminus and extending 155 degrees upwardly from the axial direction.

Further, the foregoing specifications are believed to support certain methodology for transferring energy from a fluid current. In this regard, the present invention is believed to support a method for transferring energy from a fluid current comprising the initial step of providing a turbine or rotor assembly having a shaft and a vane attached thereto. The shaft has an axis of rotation, and the vane has concave surfacing.

The concave surfacing has a J-shaped cross-section parallel to the axis of rotation and a C-shaped cross-section orthogonal to the axis of rotation. A fluid current is directed against and along the concave surfacing away from the shaft thereby creating a torque coaxial with the shaft for transferring energy from the fluid current.

The turbine assembly may preferably comprise at least two vanes each of which further have convex surfacing such that the method may comprise certain additional steps, including directing the fluid current against both the concave and convex surfacing, while directing the fluid current along the convex surfacing both toward and away from the shaft. A first current pressure is created at the concave surfacing and a second current pressure is created at the convex surfacing via the directed fluid current such that the first pressure is greater than the second pressure for enhancing or maintaining the torque.

The step of directing the fluid current along the convex surfacing toward the shaft may be further defined by comprising the step of directing the fluid current into the concave surfacing of adjacent vanes. Adjacent vanes may preferably comprise certain bridge means (as exemplified by bridge portions 30) for bridge-directing the fluid current from the convex surfacing to the concave surfacing.

Accordingly, although the invention has been described by reference to certain preferred and alternative embodiments, and certain methodology, it is not intended that the novel disclosures herein presented be limited thereby, but that modifications thereof are intended to be included as falling within the broad scope and spirit of the foregoing disclosure, the following claims and the appended drawings.

I claim:

1. A turbine assembly for transferring energy from a fluid current, the turbine assembly comprising:
    a central shaft, the central shaft being rotatable about an axis of rotation; and
    a series of vanes, the vanes each being attached to the central shaft with substantially equal spacing therebetween, the vanes each having an inverted tear drop shape, and thus comprising a C-shaped cross section through a first plane orthogonal to the axis of rotation and an inverted J-shaped cross section through a second plane parallel to the axis of rotation, said C-shaped and J-shaped cross sections each having a convex outer surface, a concave inner surface, a radially inner edge, and a radially outer edge, the convex outer surfaces each opposing and abutting the central shaft at superior vane portions and the inner radial edges opposing and abutting the central shaft at inferior vane portions, the concave inner surfaces for capturing a directed fluid current and the convex outer surfaces for deflecting said current, the concave inner surfaces and convex outer surfaces respectively being associated with first and second current pressures, the first current pressure being greater than the second current pressure for imparting a torque through the axis of rotation and rotating the central shaft.

2. The turbine assembly of claim 1 wherein the convex outer surfaces each helically wrap around a portion of the central shaft for deflecting the fluid current into the concave inner surfaces such that the concave inner surfaces capture deflected fluid current for increasing the first current pressure relative to the second current pressure.

3. The turbine assembly of claim 2 comprising bridge portions, the bridge portions connecting the radially inner edges of a series of first vanes to the convex outer surfaces of a series of second vanes, the bridge portions and convex outer surfaces of the series of vanes enclosing a transverse space about the central shaft, the bridge portions and convex outer surfaces thus for reducing drag between adjacent vanes.

4. The turbine assembly of claim 3 wherein the bridge portions direct deflected fluid current from the convex outer surfaces to the concave inner surfaces.

5. The turbine assembly of claim 1 wherein each vane comprises a pointed inferior terminus, a rounded superior terminus, and a sloped radially outer edge extending intermediate the inferior and superior termini.

6. The turbine assembly of claim 5 wherein the superior termini are separated by a V-shaped gap, each gap for reducing drag on the turbine assembly.

7. The turbine assembly of claim 1 wherein each vane comprises a center of curvature and a line of curvature, the centers of curvature being located at the upper third of the concave inner surfaces, the lines of curvature extending inwardly from the centers of curvature towards the central shaft.

8. The turbine assembly of claim 5 wherein the vanes function to capture directed fluid current intermediate a direction range, the direction range beginning in the axial direction from the inferior terminus and extending upwardly 155 degrees from the axial direction.

9. A method for transferring energy from a fluid current, the method comprising the steps of:
providing a turbine assembly, the turbine assembly comprising a shaft and at least two vanes attached to the shaft, the shaft having an axis of rotation, the vanes each having convex surfacing, concave surfacing, a radially inner edge, and a radially outer edge, the convex surfacing opposing and abutting the shaft at superior vane portions and the inner radial edges opposing and abutting the central shaft at inferior vane portions, the convex and concave surfacing having a J-shaped cross-section parallel to the axis of rotation and a C-shaped cross-section orthogonal to the axis of rotation;
directing a fluid current against the concave surfacing;
directing the fluid current along the concave surfacing away from the shaft; and
creating a torque coaxial with the shaft via the directed fluid current, the torque for transferring energy from the fluid current.

10. The method of claim 9 wherein the turbine assembly comprises at least three vanes, the method comprising the further steps of:
directing the fluid current against both the concave and convex surfacing;
directing the fluid current along the convex surfacing toward and away from the shaft; and
imparting a first current pressure against the concave surfacing and a second current pressure against the convex surfacing via the directed fluid current, the first current pressure being greater than the second current pressure.

11. The method of claim 10 wherein the step of directing the fluid current along the convex surfacing toward the shaft comprises the step of directing the fluid current into the concave surfacing of an adjacent vane.

12. The method of claim 10 wherein adjacent vanes comprise bridge portions, the bridge portions connecting the radially inner edge of a first vane to the convex surfacing of an adjacent vane, the bridge portions and convex surfacing enclosing a transverse space about the shaft, the bridge portions for bridge-directing the fluid current from the convex surfacing to the concave surfacing.

13. A method for transferring energy from a fluid current, the method comprising the steps of:
attaching a series of vanes to a shaft to provide a turbine assembly which enables the shaft to have an axis of rotation;
providing the series of vanes each with convex surfacing, concave surfacing, a radially inner edge, and a radially outer edge, the convex surfacing opposing the shaft at superior vane portions and the inner radial edges extending from the shaft at inferior vane portions, the convex and concave surfacing having a J-shaped cross-section parallel to the axis of rotation and a C-shaped cross-section orthogonal to the axis of rotation;
directing the fluid current against and along the concave surfacing away from the shaft; and
directing the fluid current along the shaft creating a torque coaxial with the shaft, and utilizing the torque from the fluid current to transfer the energy from the fluid current.

14. The method of the claim 13 wherein, the method comprises the further steps of directing the fluid current against both concave and convex surfacing.

15. An assembly for transferring energy from a fluid current, the assembly comprising:
a central shaft, the central shaft being rotatable about an axis of rotation; and
first and second vanes, the first and second vanes each being attached to the central shaft and comprising a C-shaped cross section through a first plane, a J-shaped cross section through a second plane, and bridge portions, the second plane being parallel to the axis of rotation, said first and second planes being orthogonal to one another, said cross sections each having a convex surface and a concave surface with a radially inner edge and a radially outer edge therebetween, the convex surfaces each opposing the central shaft at superior vane portions and the inner radial edges extending from the central shaft at inferior vane portions, the bridge portions connecting the radially inner edge of the first vane to the convex outer surface of the second vane adjacent the first vane, the bridge portions and convex outer surfaces of the first and second vanes enclosing a transverse space about the central shaft, the bridge portions and convex outer surfaces for reducing drag between the adjacent vanes, the concave surfaces for capturing a directed fluid current and the convex surfaces for deflecting said current, the concave surfaces and convex surfaces respectively being associated with first and second current pressures, the first current pressure being greater than the second current pressure for imparting a net rotative force to the central shaft for rotating the shaft about the axis of rotation.

16. The turbine assembly of claim 15 wherein the bridge portions direct deflected fluid current from the convex surfaces to the concave surfaces.

17. The turbine assembly of claim 15 wherein the convex surfaces deflect the fluid current into the concave surfaces such that the concave surfaces capture deflected fluid current for increasing the first current pressure relative to the second current pressure.

18. The turbine assembly of claim 15 wherein each vane comprises a pointed inferior terminus, a rounded superior terminus, and a sloped radially outer edge extending intermediate the inferior and superior termini.

19. The turbine assembly of claim 15 wherein each vane comprises a center of curvature, the centers of curvature being located at the upper third of the concave surfaces.

20. The turbine assembly of claim 19 wherein each vane comprises a line of curvature, the lines of curvature extending inwardly from the centers of curvature towards the central shaft.

21. The turbine assembly of claim 18 wherein the vanes function to capture directed fluid current intermediate a direction range, the direction range beginning in the axial direction from the inferior terminus and extending 155 degrees from the axial direction.

* * * * *